United States Patent
Bayer

(10) Patent No.: US 8,829,871 B2
(45) Date of Patent: Sep. 9, 2014

(54) CURRENT MODE CONTROL FOR DC-DC CONVERTER HAVING PEAK CURRENT DEPENDENT VARIABLE OFF-TIME

(71) Applicant: Texas Instruments Deutschland GmbH, Freising (DE)

(72) Inventor: Erich J. Bayer, Thonhausen (DE)

(73) Assignee: Texas Instruments Deutschland GmbH, Freising (DE)

( * ) Notice: Subject to any disclaimer, the term of this patent is extended or adjusted under 35 U.S.C. 154(b) by 10 days.

(21) Appl. No.: 13/653,670

(22) Filed: Oct. 17, 2012

(65) Prior Publication Data
US 2013/0300383 A1 Nov. 14, 2013

Related U.S. Application Data

(60) Provisional application No. 61/646,141, filed on May 11, 2012.

(51) Int. Cl.
*G05F 1/56* (2006.01)
*G05F 1/565* (2006.01)
*G05F 1/575* (2006.01)

(52) U.S. Cl.
USPC ............................ 323/271; 323/282; 323/351

(58) Field of Classification Search
USPC ......... 323/223, 224, 271, 282, 284, 285, 288, 323/351
See application file for complete search history.

(56) References Cited

U.S. PATENT DOCUMENTS

| | | | | |
|---|---|---|---|---|
| 6,465,993 B1 * | 10/2002 | Clarkin et al. | ................. | 323/272 |
| 7,151,361 B2 * | 12/2006 | Xi | ................... | 323/222 |
| 7,265,524 B2 * | 9/2007 | Jordan et al. | .................. | 323/225 |
| 7,276,861 B1 * | 10/2007 | Shteynberg et al. | .......... | 315/291 |
| 7,772,823 B2 * | 8/2010 | Blanken | ......................... | 323/284 |
| 7,893,678 B2 * | 2/2011 | Blanken | ......................... | 323/285 |
| 8,174,209 B2 * | 5/2012 | Bayer et al. | .................... | 315/294 |
| 8,179,110 B2 * | 5/2012 | Melanson | ...................... | 323/282 |
| 2007/0108951 A1 * | 5/2007 | Coleman | ....................... | 323/282 |
| 2010/0194368 A1 * | 8/2010 | Taylor et al. | .................... | 323/284 |
| 2011/0316501 A1 * | 12/2011 | Cervera et al. | ................. | 323/268 |
| 2012/0169240 A1 * | 7/2012 | Macfarlane | .................... | 315/152 |
| 2013/0314067 A1 * | 11/2013 | Matzberger et al. | .......... | 323/311 |

* cited by examiner

*Primary Examiner* — Adolf Berhane
*Assistant Examiner* — Nusrat Quddus
(74) *Attorney, Agent, or Firm* — William B. Kempler; Frederick J. Telecky, Jr.

(57) ABSTRACT

A DC-DC converter includes a current control stage configured to provide a threshold based on an output voltage, an input voltage, and a reference voltage for the DC-DC converter. An off time control can be configured to receive the threshold and control an off time for the DC-DC converter based on the threshold such that the off time is inversely proportional to the peak current generated by the DC-DC converter.

16 Claims, 3 Drawing Sheets

CURRENT MODE CONTROL FOR DC-DC CONVERTER HAVING PEAK CURRENT DEPENDENT VARIABLE OFF-TIME

CROSS-REFERENCE TO RELATED APPLICATION

This application claims the benefit of U.S. Provisional Patent Application 61/646,141 filed on May 11, 2012, entitled CURRENT MODE CONTROL WITH PEAK CURRENT DEPENDENT VARIABLE OFF-TIME AND AUTOMATIC PULSE SKIPPING, the entirety of which is incorporated by reference herein.

TECHNICAL FIELD

This disclosure relates to a system and method to provide current mode control for DC-DC converters.

BACKGROUND

Voltage converters such as DC-DC converters come in two forms. When an input voltage is to be stepped up in voltage by the converter, a boost or step-up configuration is provided. When the input voltage needs to be stepped down to a lower voltage by the converter, a buck converter is provided. Thus, a buck converter is a step-down DC-DC converter. Its design is similar to the step-up boost converter, and like the boost converter, it is a switched-mode power supply that employs switches (e.g., a transistor and a diode), an inductor and a capacitor. Switching converters can be quite efficient (e.g., 95% or higher for integrated circuits), making them useful for tasks such as converting the main voltage in a computer (e.g., 12 V in a desktop, 12-24 V in a laptop) down to the 0.8-1.8 volts needed by the processor.

Inductive DC-DC Converters running with constant switching frequency have a principle problem that they run with low power efficiency at light loads due to high (constant) switching losses that mainly depend on the switching frequency. To overcome this, designers employ skip-or burst modes to reduce the number of switching cycles at light loads. The problem with these operating modes is that they need additional sense and control circuits in addition to the fact that they generate high ripple voltages on the output.

SUMMARY

In one example, a current control stage can be configured to provide a threshold based on an output voltage, an input voltage, and a reference voltage for the DC-DC converter. An off time control can be configured to receive the threshold and control an off time (TOFF) for the DC-DC converter based on the threshold such that the off time is inversely proportional to a peak current (IPEAK) generated by the DC-DC converter.

In another example, a method includes providing a threshold at a first input of a comparator to define an off time for a DC-DC converter such that the off time is inversely proportional to the peak current generated by the DC-DC converter. The method includes generating a ramp signal at a second input of the comparator, wherein the ramp input is compared to the threshold by the comparator to control a switching frequency of the DC-DC converter based on the off time.

In yet another example, a DC-DC converter includes a current control stage configured to generate a threshold to set an off time for a DC-DC converter such that the off time is inversely proportional to the peak current generated by the DC-DC converter. The DC-DC converter can include a TOFF control configured to monitor the threshold and to generate an output to control a switching frequency for the DC-DC converter. A ramp generator can be configured to supply a ramp signal to the TOFF control, wherein the TOFF control compares the ramp signal to the threshold to dynamically adjust the switching frequency of the DC-DC converter.

DETAILED DESCRIPTION

Figure 1:
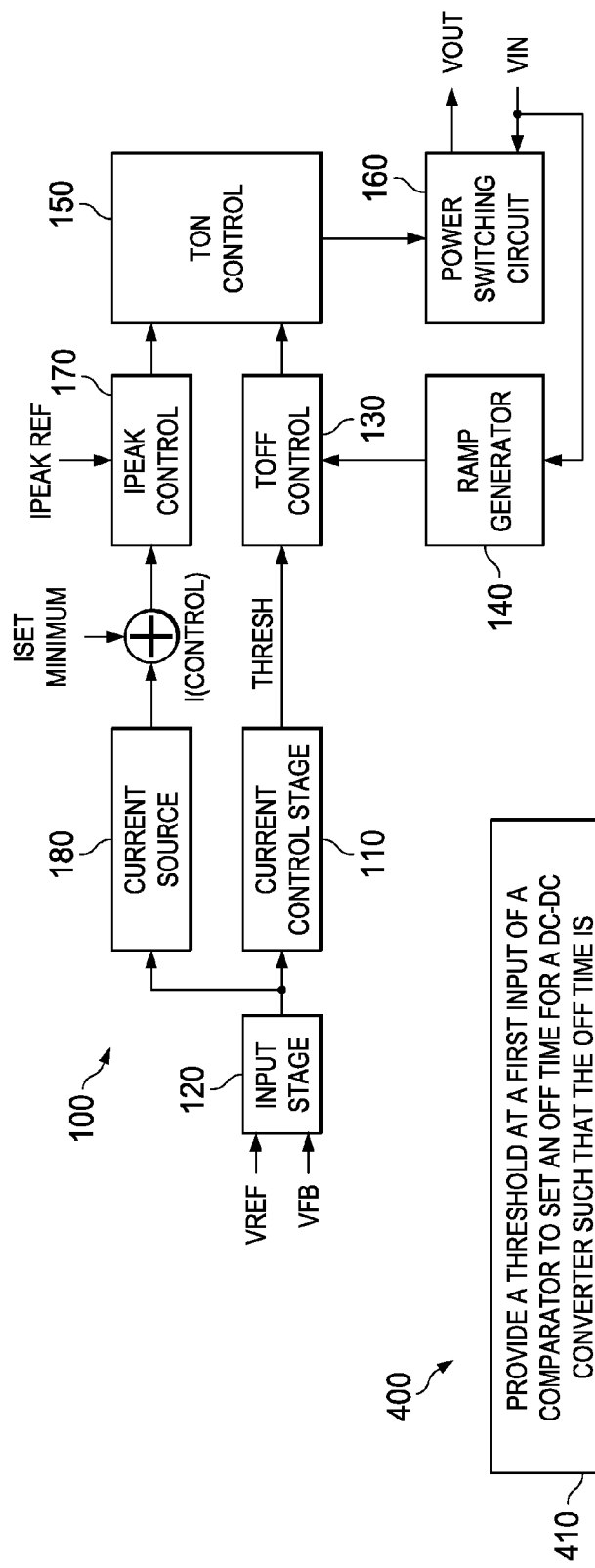
FIG. 1 illustrates an example of a DC-DC converter that employs current mode control to dynamically adjust operating modes for the converter.

FIG. 1 illustrates an example of a DC-DC converter 100 that employs current mode control to dynamically adjust operating modes for the converter. The DC-DC converter 100 includes a current control stage 110 configured to provide a threshold based on an output voltage (VFB, which is a feedback based on the output voltage), an input voltage (VIN), and a reference voltage (VREF) for the DC-DC converter. As shown, VREF and VFB are supplied as inputs to an input stage 120 that drives the current control stage 120. An off time (TOFF) control 130 can be configured to receive the threshold and control an off time for the DC-DC converter 100 based on the threshold such that the off time is inversely proportional to the peak current (IPEAK) generated by the DC-DC converter. The threshold can be dynamically adjusted based on detected peak current. This dynamic adjustment allows the DC-DC converter 100 to operate in different operational modes (e.g., no switching, variable frequency switching, maximum frequency switching) based on the load current. A ramp generator 140 supplies a ramp signal to the TOFF control that can also be enabled or disabled depending on the detected load condition. Thus, the threshold and/or the ramp signal can be altered depending on detected load current of the DC-DC converter 100.

For example, if very light loads are detected, the ramp generator 140 can be disabled (e.g., via a semiconductor device) causing the TOFF control 130 to disable current generated at the output of the DC-DC converter 100 which increases efficiency of the converter. For medium or intermediate loads, the ramp signal from the ramp generator 140 in conjunction with the threshold cause the TOFF control 130 to enter into a variable frequency mode of operation where switching frequency is variable based on the detected load current which in turn causes the threshold to change. For very heavy current loads, the threshold can become fixed causing the DC-DC converter 100 into a mode of maximum frequency and switching operation. As shown, output from the TOFF control 130 can be fed to a TON control 150 which also helps to set peak current in the DC-DC converter 100. The TON control 150 controls power switches and inductor current in a power switching circuit 160. The power switching circuit 160 controls VOUT of the DC-DC converter 100 by switching current into an inductor (shown below with respect to FIG. 2). A separate current control input to the TON control 150 is provided from an IPEAK control 170 that operates based on an ISET min signal that is summed with an I(control) signal generated from a current source 180 which is driven from the input stage 120.

In one example, the current control stage 110 can include a first transistor to set a control current for the DC-DC converter 100 and a second transistor to set a threshold current that is employed to generate the threshold, wherein such transistors and other circuitry described herein will be illustrated below with respect to FIG. 2. The current source 180 can be placed in parallel to a control current to set a minimum current ISETmin for the DC-DC converter 100. The minimum current ISETmin can be related to a minimum peak current value IPEAKmin according to the equation:

$$IPEAKmin \approx ISETmin*N,$$

where N represents a current size relationship between a power switch that switches current in an inductor for the DC-DC converter 100 and a sense switch that senses the sum of the control current I(control) and the minimum current ISETmin in the DC-DC converter.

As noted above, the ramp generator 140 supplies a ramp signal to the TOFF control 130 to facilitate adjustment of a switching frequency of the DC-DC converter 100. The TOFF control 130 can include a comparator that receives the threshold on a first input of the comparator and the ramp signal from the ramp generator 140 on a second input of the comparator to generate a comparator output for the TOFF control 130 that controls the switching frequency of the DC-DC converter under different load conditions. A semiconductor device can be included in series with the current I(toff) inside the ramp generator 140 to enable a pulse-skip mode where output current is disabled while voltage across the semiconductor device is below the threshold. Various configurations for the semiconductor device can be provided. For example, the semiconductor device can be implemented as a diode, such as a semiconductor diode or a diode-connected transistor. In other examples, the diode can be a solid state diode or other device that can control current flow to or from the ramp generator, for example.

A current source can be provided in the ramp generator 140 which is placed in series with the semiconductor device to set a TOFF current I(toff) to facilitate adjustment of a minimum off time TOFF (min) for the DC-DC converter 100. A capacitor can also be employed in series with the semiconductor device and the second current source to facilitate adjustment of the minimum off time TOFF (min) for the DC-DC converter 100. The current mode controls and dynamic mode switching of the DC-DC converter 100 as described herein can be applied to substantially any type of converter. For example, the DC-DC converter 100 can be configured in a step-up configuration or in a step-down configuration.

It is noted that the examples described herein can be provided via different circuit implementations including digital or analog implementations which can be discrete or integrated. For instance, in one example a resistor/capacitor filter could be employed, or in another example a switched capacitor filter could be employed. Similarly, in some examples, transconductance amplifiers may be employed and in other examples, voltage-controlled operational amplifiers can be employed. In some cases, field effect transistors can be employed and in other cases junction transistors or diodes employed. Some control components can be employed as discrete implementations such as a comparator comparing a reference signal to a control signal and in other examples, controllers operating via processor instructions and exchanging data via DA and AD converters could be employed to monitor reference voltages and generate control signals within the DC-DC converter 100.

Figure 2:
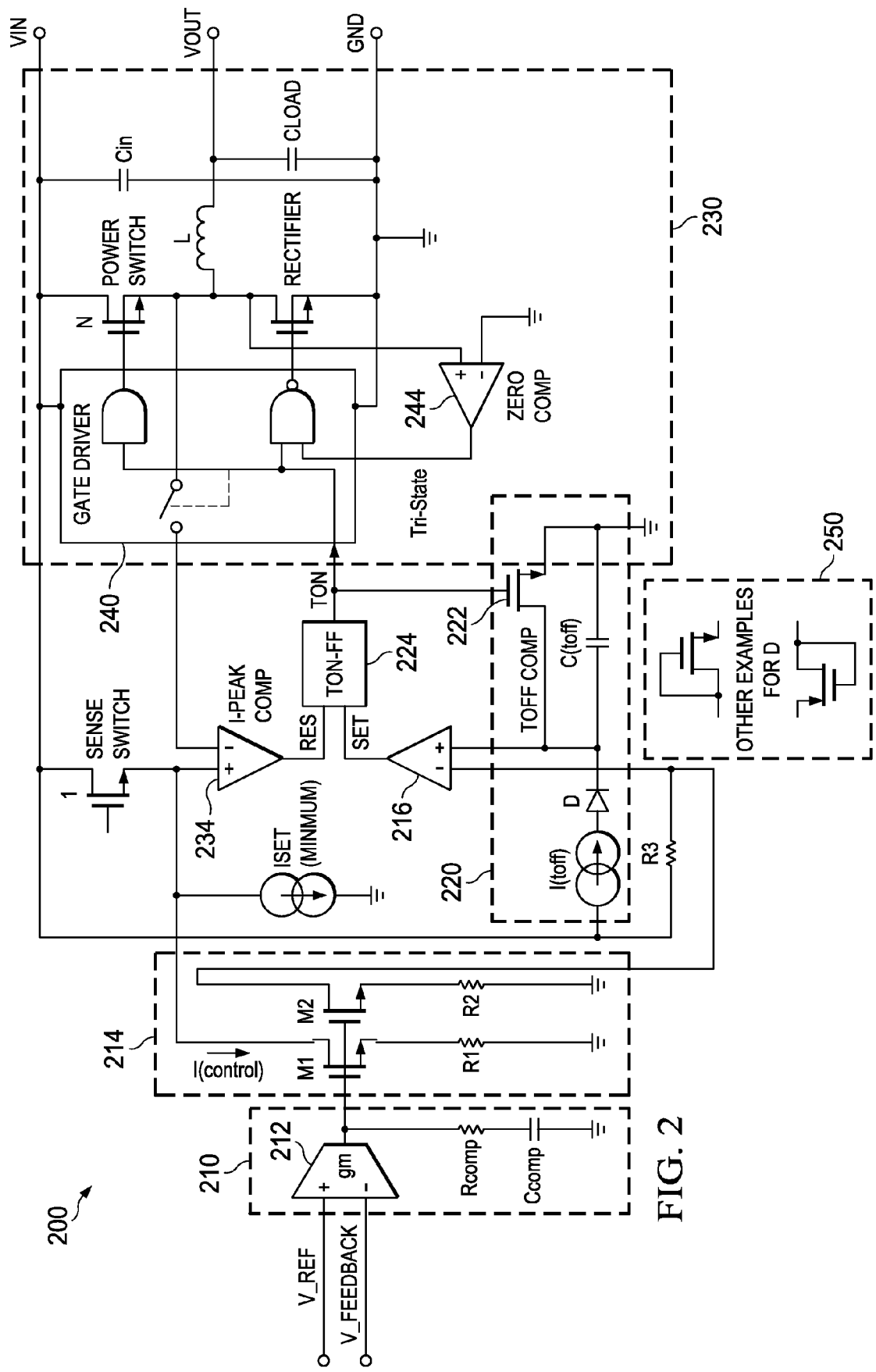
FIG. 2 illustrates an example DC/DC converter circuit providing current mode control for the converter.

FIG. 2 illustrates an example DC-DC converter circuit 200 providing current mode control for the converter. The circuit 200 includes an input stage 210 that includes a transconductance amplifier 212 that monitors inputs V-REF and V_FEEDBACK (same as VFB in FIG. 1) and is filtered at its output via resistor and capacitor Rcomp and Ccomp respectively. The input stage 210 drives a current control stage 214 which includes a first transistor M1 and resistor R1 to set a control current for the DC-DC converter and a second transistor M2 and resistor R2 setting a threshold current for the converter which sets a threshold voltage across resistor R3. The threshold voltage across R3 is applied to an input of a TOFF comparator 216, wherein the TOFF comparator was referred to as TOFF control 130 in FIG. 1 and the threshold voltage across R3 was referred to as the threshold in FIG. 1. A ramp generator 220 supplies the other input to the TOFF comparator 216. The ramp generator 220 can include an I(toff) current source, a diode D for operation at light loads, a capacitor Ctoff to control the slope of the ramp signal, and a transistor 222 to reset the ramp generator.

As a further example, reference numeral 250 demonstrates some alternative configurations for the diode D in the ramp generator 220. In this example, the alternative example configurations include diode-connected transistors configured and operated as diodes.

Output from the TOFF comparator 216 feeds a TON control 224 (e.g., flip flop) which in turn drives a power switching circuit 230. Another input to the TON control 224 is received from an IPEAK comparator 234 (e.g., corresponding to IPEAK control 170 of FIG. 1). The IPEAK comparator 234 receives an input relating to inductor current from the power switching circuit 230 and another input associated with a current that is represented by the sum of the control current labeled as I(control) and a fixed current source labeled as ISETmin (referred to as current source 180 of FIG. 1). The power switching circuit 230 can include an inductor L, power switch, and rectifier which are driven from a gate driver 240. The power switching circuit 230 can also include an input capacitor Cin, a load capacitor CLoad and a ZERO comparator 244.

As shown, the power switching circuit 230 receives VIN and switches current through the inductor L to generate VOUT. The input voltage VIN is also supplied to the ramp generator and one end of the threshold resistor R3. The input VIN is also sensed via a sense switch which supplies the current source ISETmin and the current control path of M1 and R1.

In an aspect, the circuit 200 can control the off-time of a DC-DC converter such that TOFF~1/IPEAK by adding an additional current control stage, demonstrated as transistor M2 and resistor R2, controlled by the output of the amplifier 212. The drain current of this additional stage defines the threshold voltage of the TOFF comparator 216 across R3. The current source ISET(min) is provided in parallel to the control current though M1/R1 which defines the peak current as IPEAK=[I(control)+ISET(min)]*N which defines a ratio of current between the power switch and the sense switch. The diode D can be placed in series with the current source I(toff) for the TOFF ramp generator 220. At full load, the minimum TOFF can be represented as: TOFF(min)=(C(toff)/I(toff))*(VIN*R2/(R2+R3)). With light loads, the drain current of M2 decreases with the consequence that there is a smaller voltage drop across R3. Therefore, the voltage on the inverting input of the TOFF comparator 216 rises which results in an increased TOFF and therefore in a reduction of switching frequency for the DC-DC converter.

At light or zero loads, when the voltage drop across R3 is below the forward voltage of the diode D, the non-inverting input of the TOFF comparator 216 can no longer reach the reference voltage on the inverting input which results in TOFF approaching infinite. The full system thus waits or "Pulse-Skips" in this condition until the output voltage of the amplifier 212 is high enough so that the voltage across R3 matches the forward voltage across the diode D. As noted above, there can be several implementations for D which could be a real junction diode or PCH/NCH diode operated MOS transistors such as shown at 250, for example.

Figure 3:
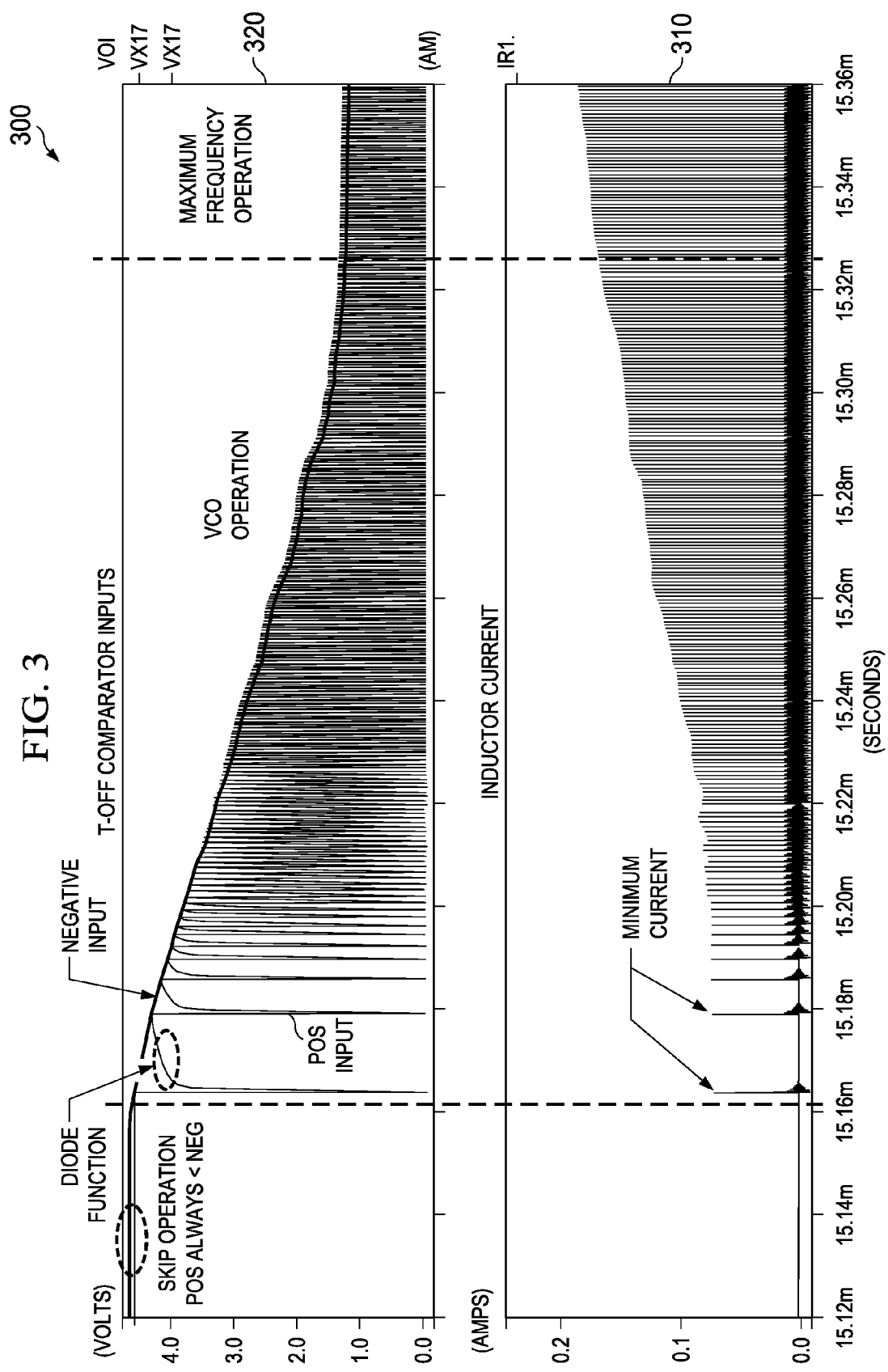
FIG. 3 illustrates an example signal diagram depicting operational modes for a DC-DC converter.

FIG. 3 illustrates an example signal diagram 300 depicting operational modes for a DC-DC converter. The diagram 300 shows the inductor current of a DC-DC Converter at graph 310 and the positive and negative inputs of the TOFF comparator 216 of FIG. 2 at graph 320. At light loads, the system automatically stops switching (SKIP MODE) since the positive input can no longer reach the negative input of the TOFF comparator. At medium loads, the TOFF comparator threshold voltage (negative input of TOFF comparator) follows the inductor current which ends up in a variable frequency (e.g., voltage-controlled oscillator (VCO)) operation. At heavy loads, the negative input stops moving so the TOFF comparator now runs with a fixed threshold voltage which ends up in a fixed maximum frequency operation.

Figure 4:
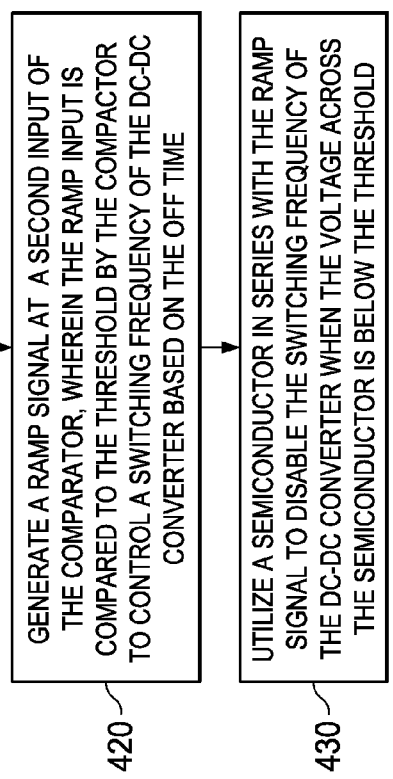
FIG. 4 illustrates an example method to provide current-mode control of a DC/DC converter.

In view of the foregoing structural and functional features described above, an example method will be better appreciated with reference to FIG. 4. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 4 illustrates an example method 400 to provide current-mode control of a DC-DC converter. At 410, the method 400 includes providing a threshold (e.g., via current control stage 110 of FIG. 1) at a first input of a comparator to set an off time for a DC-DC converter such that the off time is inversely proportional to the peak current generated by the DC-DC converter. At 420, the method 400 includes generating a ramp signal at a second input of the comparator, wherein the ramp input is compared to the threshold by the comparator to control a switching frequency of the DC-DC converter based on the off time. At 430, the method 400 includes utilizing a semiconductor device in series with the ramp signal to disable the switching frequency of the DC-DC converter when the voltage across the semiconductor device is below the threshold.

Although not shown, the method 400 can also include enabling a variable frequency operation for the DC-DC converter when the semiconductor device is conducting and the threshold is dynamically adjusted below a maximum current load for the DC-DC converter. This can include enabling a maximum frequency operation for the DC-DC converter when the threshold becomes fixed at the maximum current load for the DC-DC converter. The method 400 can also include utilizing a first current source in series with the semiconductor device to define a minimum off time current Itoff for the DC-DC converter. The method includes utilizing a second current source in parallel to a control current for the DC-DC converter to set a minimum current ISETmin for the DC-DC converter. The minimum current ISETmin can be related to a minimum peak current value IPEAKmin according to the equation IPEAKmin is about equal to ISETmin*N, wherein N represents a current size relationship between a power switch that switches current in an inductor for the DC-DC converter and a sense switch that senses the minimum current ISETmin in the DC-DC converter.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A DC-DC converter, comprising:
a current control stage configured to provide a threshold based on an output voltage, an input voltage, and a reference voltage for the DC-DC converter, wherein the current control stage further comprises a first transistor to set a control current for the DC-DC converter and a second transistor to set a threshold current that is employed to generate the threshold; and
an off time control configured to receive the threshold and control an off time (TOFF) for the DC-DC converter based on the threshold such that the off time is inversely proportional to a peak current (IPEAK) generated by the DC-DC converter, wherein a first current source in parallel to the control current to set a minimum current ISETmin for the DC-DC converter.

2. The DC-DC converter of claim 1, wherein the minimum current ISETmin is related to a minimum value of the peak current IPEAKmin for the DC-DC converter according to an equation $$IPEAKmin \approx ISETmin*N,$$

wherein N represents a size relationship between a power switch configured to switch current in an inductor for the DC-DC converter and a sense switch that is configured to sense the minimum current ISETmin for the DC-DC converter.

3. The DC-DC converter of claim 1, further comprising a ramp generator configured to supply a ramp signal to the TOFF control to facilitate adjustment of a switching frequency of the DC-DC converter.

4. The DC-DC converter of claim 3, wherein the TOFF control further comprises a comparator configured to receive the threshold on a first input of the comparator and the ramp signal on a second input of the comparator to generate a comparator output for the TOFF control that controls the switching frequency of the DC-DC converter under different load conditions.

5. The DC-DC converter of claim 3, further comprising a semiconductor device in series with the ramp generator to enable a pulse-skip mode where output current is disabled while voltage across a ramp-capacitor C(toff) is below the threshold.

6. The DC-DC converter of claim 5, wherein the semiconductor device comprises a diode or a transistor configured as a diode.

7. The DC-DC converter of claim 6, further comprising a current source in series with the semiconductor device to set a TOFF current Itoff to facilitate adjustment of a minimum off time TOFF (min) for the DC-DC converter.

8. The DC-DC converter of claim 7, further comprising a capacitor in series semiconductor device and the second current source to facilitate adjustment of the minimum off time TOFF (min) for the DC-DC converter.

9. The DC-DC converter of claim 1, wherein the DC-DC converter is configured in a step-up configuration or in a step-down configuration.

10. A method, comprising:
providing a threshold at a first input of a comparator to set an off time for a DC-DC converter such that the off time is inversely proportional to the peak current generated by the DC-DC converter; and
generating a ramp signal in a circuit coupled to a second input of the comparator, wherein the ramp input is compared to the threshold by the comparator to control a switching frequency of the DC-DC converter based on the off time, further comprising utilizing a semiconductor device in series with the ramp signal to disable the switching frequency of the DC-DC converter when the voltage across the semiconductor device is below the threshold.

11. The method of claim 10, further comprising enabling a variable frequency operation for the DC-DC converter when the semiconductor device is conducting and the threshold is dynamically adjusted below a maximum current load for the DC-DC converter.

12. The method of claim 11, further comprising enabling a maximum frequency operation for the DC-DC converter when the threshold becomes fixed at the maximum current load for the DC-DC converter.

13. The method of claim 10, further comprising utilizing a first current source in series with the semiconductor device to define a minimum off time current Itoff for the DC-DC converter.

14. The method of claim 10, further comprising utilizing a second current source in parallel to a control current for the DC-DC converter to set a minimum current ISETmin for the DC-DC converter.

15. The method of claim 14, wherein the minimum current ISETmin is related to a minimum peak current value IPEAKmin according to the equation IPEAKmin≈ISETmin*N, wherein N represents a current size relationship between a power switch that switches current in an inductor for the DC-DC converter and a sense switch that senses the sum of the control current I(control) and the minimum current ISETmin in the DC-DC converter.

16. A DC-DC converter, comprising:
a current control stage configured to generate a threshold to define an off time for a DC-DC converter such that the off time is inversely proportional to the peak current generated by the DC-DC converter;
a TOFF control configured to monitor the threshold and to generate an output to control a switching frequency for the DC-DC converter; and
a ramp generator configured to supply a ramp signal to the TOFF control, wherein the TOFF control compares the ramp signal to the threshold to dynamically adjust the switching frequency of the DC-DC converter, further comprising a semiconductor device in series with the ramp signal to disable the switching frequency of the DC-DC converter when the voltage across the ramp-capacitor C(toff) is below the threshold.

* * * * *